United States Patent Office 3,517,459
Patented June 30, 1970

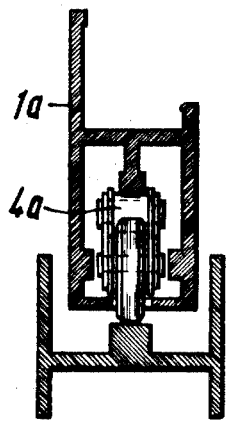
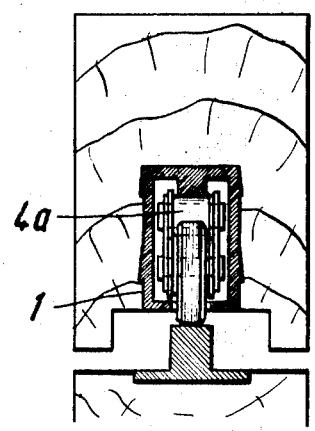
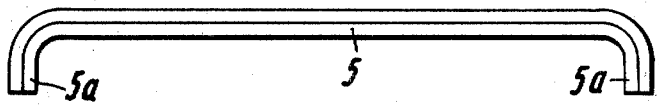
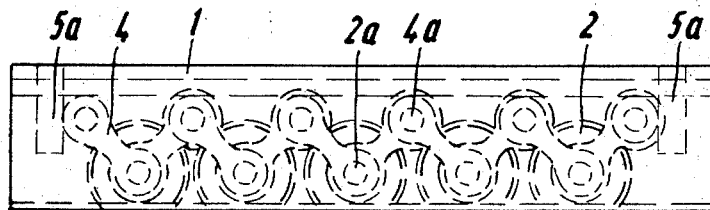
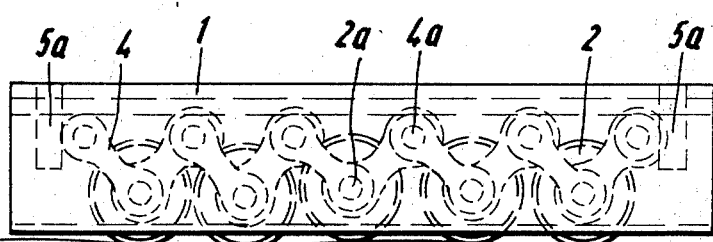

---

3,517,459
ROLLER SUPPORT FOR A SLIDING DOOR, A SLIDING WINDOW, OR THE LIKE
Heinrich Schupper, 13 Bannweg,
7853 Steinen, Germany
Filed Nov. 4, 1968, Ser. No. 773,199
Claims priority, application Germany, Nov. 4, 1967,
1,708,138
Int. Cl. E05d *13/02*
U.S. Cl. 49—425       8 Claims

ABSTRACT OF THE DISCLOSURE

A roller support for a sliding door, a sliding window, or the like with vertically movable and insofar motionally interdependent rollers wherein a gear chain, including said rollers, is positioned between said door or said window to be shifted and a stationary supporting surface, respectively, so as to equalize the load among said rollers.

SUMMARY OF THE INVENTION

The invention relates to a roller support for a sliding door, a sliding window, or the like which are provided with vertically movable and insofar motionally interdependent rollers.

In case of known constructions of this kind, two carriages at the most cooperate with each other which are connected to a balance. Constructions of this kind require a relatively large space for mounting and, moreover, a high specific surface pressure.

The present invention eliminates these difficulties respectively disadvantages in a perfect manner by a gear chain, including rollers, which is positioned between said door or window to be shifted and a stationary supporting surface, respectively, so as to equalize the load among the aforesaid rollers.

In this way, it is possible to adapt the number of said rollers to the load to be carried or shifted, whereby said rollers, in any case, automatically equalize any possible unevenness of the rolling surface and any differences in their own size.

Another feature of the invention is to be seen in the fact that said chain links are being formed by levers.

In an especially uncomplicated embodiment of the invention, said chain links are being formed by cooperating first and second curve elements.

In this connection, said curve elements have the form of cooperating slant planes, wherein said first curve elements are slidable in a horizontal plane defined by the lower edge of said sliding door or window, whereas said second curve elements are positioned between said first curve elements.

Another embodiment of the invention relates to a roller support wherein said first elements have the form of an inversed roof, whereas said second curve elements are roof-shaped as well and cooperate with said first curve elements.

It is useful that said first and second curve elements consist of different materials with good sliding abilities.

Especially when used for wooden doors or windows, said gear chain is accommodated in a housing, the latter being carried by the lower edge of said sliding door or window.

The roller support can be attached particularly advantageously when said gear chain is accommodated in a box-like profile of said sliding door or window.

BRIEF DESCRIPTION OF THE DRAWING

FIG. 1 is a cross-section of an embodiment of the invention according to FIGS. 4 and 5 maunted in a housing;

FIG. 2 is a cross-section of an embodiment mounted in a corresponding profile of a sliding door or window;

FIG. 3 is a side view of a bracket holding together a gear chain;

FIG. 4 is a side view of a gear chain;

FIG. 5 is a side view of a gear chain with uneven rolling surface;

DESCRIPTION OF THE PREFERRED EMBODIMENTS

Figure 6:
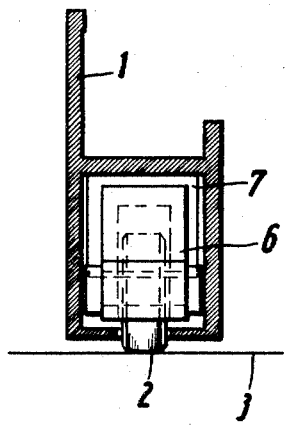
FIG. 6 is a cross-section of a modified embodiment of the representation according to FIG. 2.

According to FIGS. 1 to 4, a sliding door or window is provided, at its lower edge, with a housing 1 or a box-like profile 1a. In the latter, several rollers 2 are accommodated which rest on a rolling surface 3. Two pairs of levers 4 each engage at the axes 2a of the rollers 2.

The pairs of levers 4 are linked together at upper joints which have the form of rolls 4a and carry a housing 1 or a door or window profile 1a and thus the load to be shifted. Each of the two outer levers rest against stops 5a. These can, according to FIG. 3, have the form of arms of a removable U-shaped bracket 5.

If such a unit moves along an uneven surface 3a (FIG. 5), the individual rollers 2 follow any unevenness, while all of the rolls 4a remain in contact with the profile or the housing 1. Merely the angles of the levers 4 change relative to the vertical. It is for this very reason that a uniform and steady transmission of the sliding doors or window to its rolling surface 3 is automatically assured.

Figure 7:
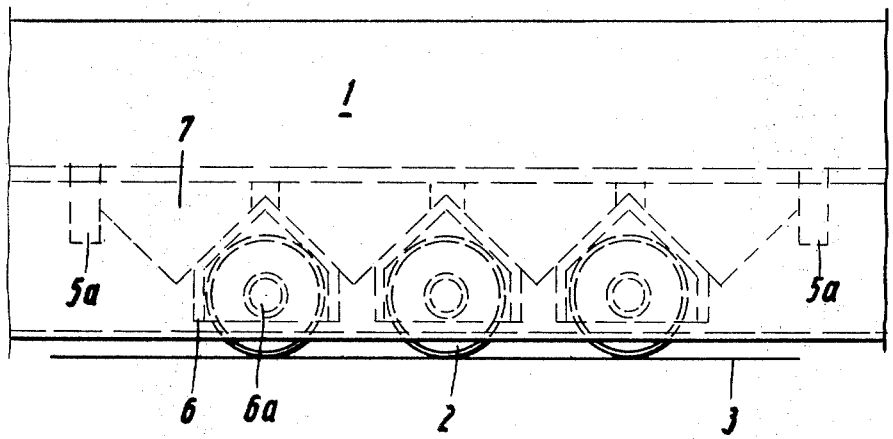
FIG. 7 is a side view of an embodiment according to FIG. 6 in a representation according to FIG. 4.
Figure 8:
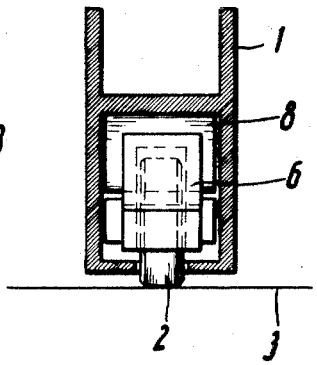
FIG. 8 is a cross-section of a modified embodiment of the representation according to FIG. 2 or 6.
Figure 9:
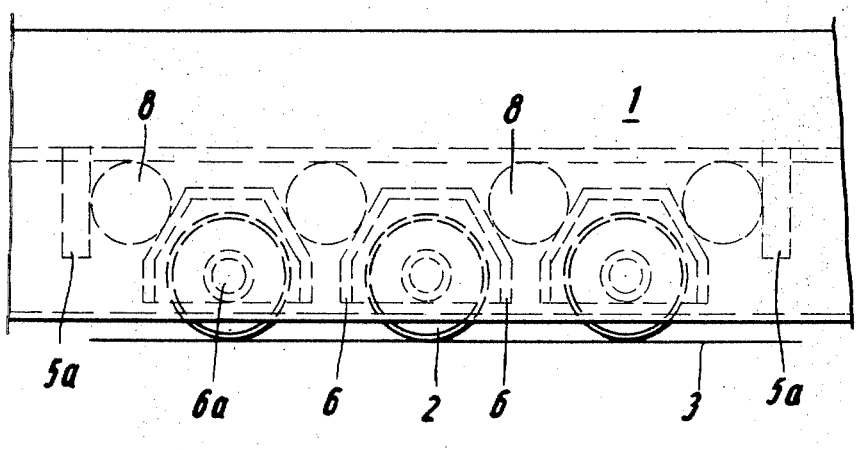
FIG. 9 is a side view of an embodiment according to FIG. 8 in a representation according to FIG. 4 or 7.

The embodiments represented in FIGS. 6, 7 or 8, 9 have, in principle, the same effect. Instead of a force-locking motional connection, a form-locking motional connection between said individual elements has been chosen. In this connection, the rollers 2 are mounted on axes 6a of roof-shaped curve elements 6. According to FIG. 7, the curve elements 7 serving as second links and, having an inversed roof shape, are slidingly resting on the first links namely the curved elements 6 and serve as a support for the sliding door or window and, according to FIG. 9, may be replaced by rolls 8.

The two curve elements 6, 7 of each pair of curves consist of different materials with good sliding abilities, e.g. steel and synthetic resin.

The two outer of the curve elements 7 may, at the same time, serve as stops and may thus be accordingly attached to said sliding door or window.

I claim:

1. A roller support for supporting a movable element slidably with reference to a stationary support surface, comprising a plurality of independently turnable rollers arranged in axial parallelism with one another; a plurality of first links each cooperating with one of said rollers; and a plurality of second links each located between and cooperating with two successive ones of said first links, said links and rollers being movable relative to one another and together constituting a chain adapted to equalize the load among said rollers.

2. The roller support as defined in claim 1, wherein said links are levers.

3. The roller support as defined in claim 1, wherein said links are cooperating first and second curve elements.

4. The roller support as defined in claim 3, wherein said curve elements have the form of cooperating slant planes, and wherein said first curve elements are slidable in a horizontal plane defined by a lower edge of said movable element, whereas said second curve elements are positioned between said first curve elements.

5. The roller support as defined in claim 4, wherein said first curve elements have the form of an inversed roof, whereas said second curve elements are roof-shaped and cooperate with said first curve elements.

6. The roller support as defined in claim 4, wherein said first and second curve elements consist of different materials with good sliding abilities.

7. The roller support as defined in claim 1, further comprising a housing accommodating said chain and mountable on a lower edge of said movable element.

8. The roller support as defined in claim 1, said movable element having a lower edge provided with a recess extending therealong and being open to said support surface, and said chain being accommodated in said recess.

References Cited
UNITED STATES PATENTS

| | | | |
|---|---|---|---|
| 1,792,568 | 2/1931 | Boedtcher | 16—106 |
| 2,358,007 | 9/1944 | Henley | 16—99 X |
| 3,237,238 | 3/1966 | Anderson | 49—425 X |

FOREIGN PATENTS

| | | |
|---|---|---|
| 237,244 | 12/1964 | Austria. |
| 603,189 | 9/1934 | Germany. |
| 408,697 | 2/1966 | Switzerland. |

J. KARL BELL, Primary Examiner

U.S. Cl. X.R.

16—91, 99